April 23, 1968     H. H. KERN     3,379,378

IRRIGATION SYSTEM

Filed Sept. 30, 1966     4 Sheets-Sheet 1

INVENTOR

HADLEY H. KERN

BY Rommel, Alwine & Rommel

ATTORNEYS

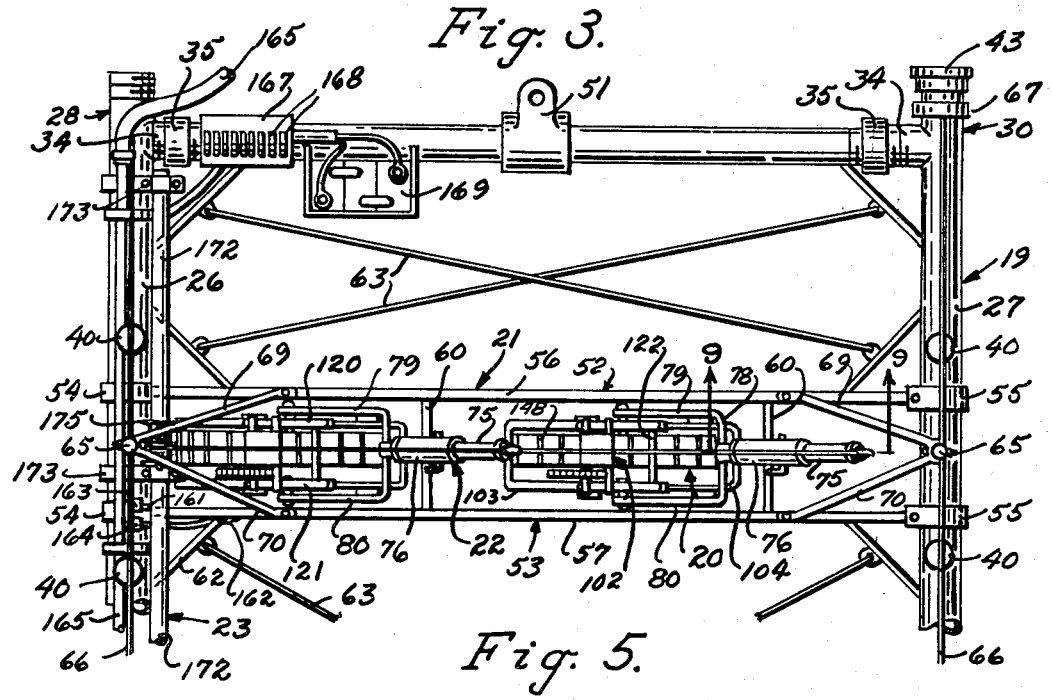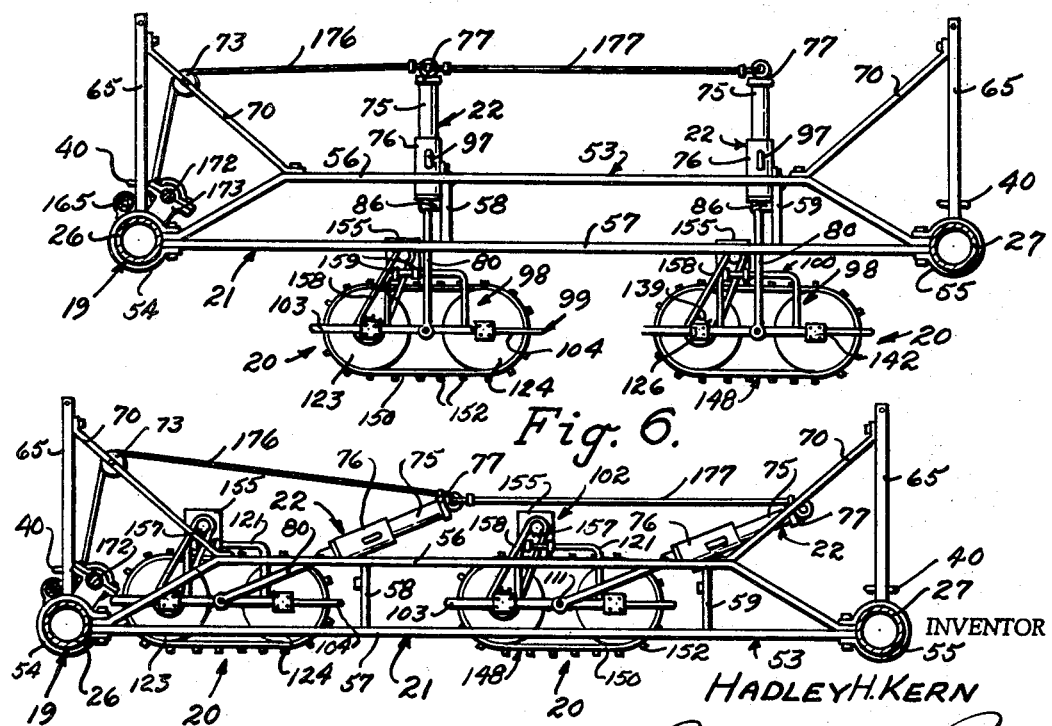

April 23, 1968 H. H. KERN 3,379,378
IRRIGATION SYSTEM
Filed Sept. 30, 1966 4 Sheets-Sheet 3
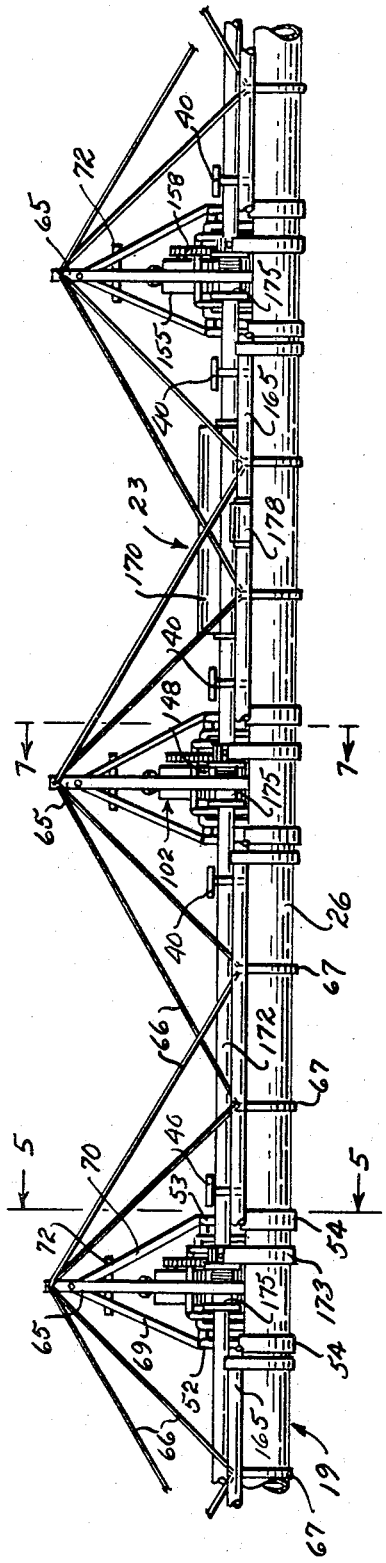
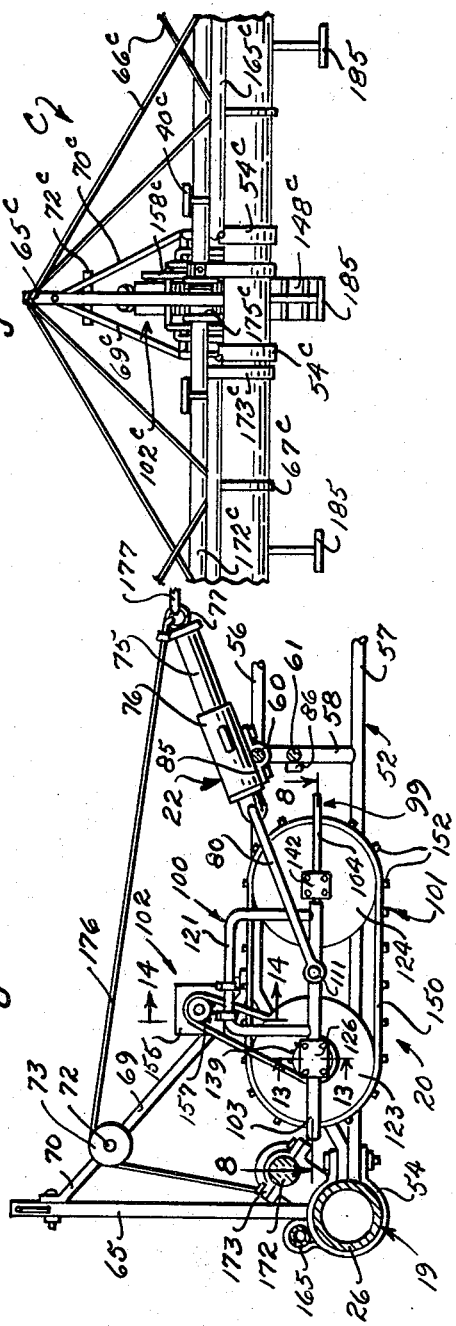
INVENTOR
HADLEY H. KERN
BY Rommel, Allwine & Rommel
ATTORNEYS April 23, 1968 H. H. KERN 3,379,378
IRRIGATION SYSTEM
Filed Sept. 30, 1966 4 Sheets-Sheet 4
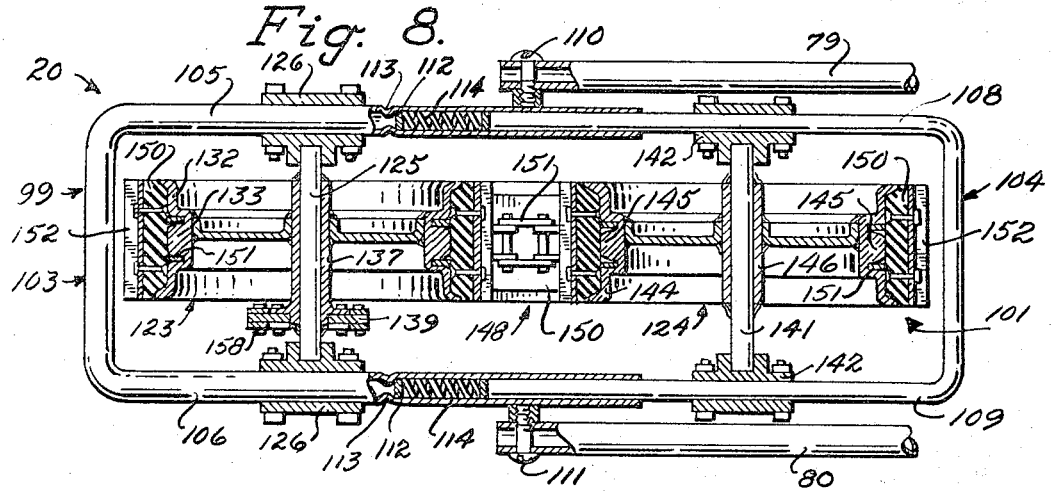
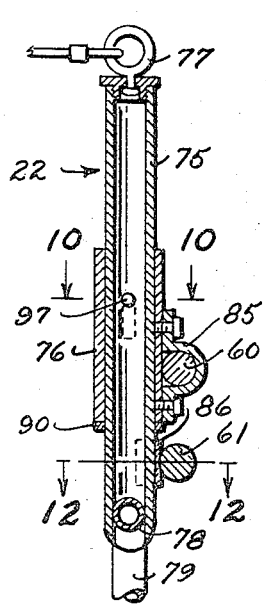
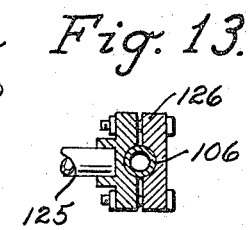
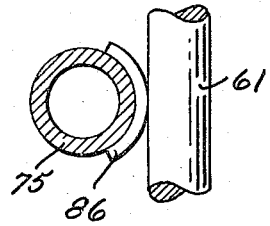
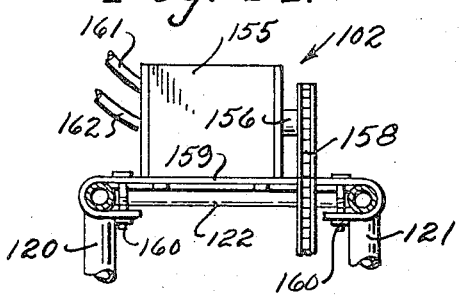
INVENTOR
HADLEY H. KERN
BY Rommel, Allwine & Rommel
ATTORNEYS

United States Patent Office 3,379,378
Patented Apr. 23, 1968

1

3,379,378
IRRIGATION SYSTEM
Hadley H. Kern, Star Rte. 2, Morton, Tex. 79346
Filed Sept. 30, 1966, Ser. No. 583,242
12 Claims. (Cl. 239—212)

This invention relates to improvements in irrigation systems.

In the pipeline irrigation of large fields, it has been the usual practice to lay long lateral lines of spray emittent water pipe across the field for irrigation of a given area of the field; when that area has been irrigated, to uncouple the pipe in various lengths which can be easily handled and transport the same to a new area to be irrigated; and there recouple the pipes. Such irrigation pipe might be uncoupled in fairly short segments and transported by hand, or uncoupled in longer lengths which might be wheel mounted, as shown in U.S. Patent No. 3,230,969, dated Jan. 25, 1966 and U.S. Patent No. 3,245,608, dated Apr. 12, 1966. Since the lateral line of irrigation pipe may extend lineally for a quarter of a mile or more, it can be readily appreciated that each movement of the pipe has heretofore been quite an undertaking.

The primary object of this invention is the provision of an irrigation system comprising an integral unit which may be moved with facility from place to place.

A further object is the provision of a unitarily transportable irrigation system which may include irrigation pipes lineally extendant for a quarter of a mile or more and having means for maintaining alignment of such lineal pipes during movement thereof and upon reaching a given location.

A further object is the provision of an irrigation system having elongated lineal irrigation pipes and improved vehicle means for supporting the same in unitary movement thereof.

A further object is the provision of improved vehicle means for support of an irrigation system including lineally extending irrigation pipe, which vehicle means are operable to a transport position in support of the lineally extending irrigation pipe for mobile orientation thereof and operable to a retracted position for ground support of the irrigation pipe upon reaching a given area to be irrigated. This is a particularly important feature inasmuch as ground supported irrigation pipe provides better watering patterns and enables the placement of the system in a position to avoid damaging winds.

A further object is the provision of an improved irrigation system including lineally extendant pipe and wherein presently used, hand moved irrigation pipe may be interconnected to comprise the lineally extendant pipe thereof, resulting in considerable saving in changeover from presently used irrigation methods to my improved irrigation system.

A further object is the provision of an irrigation system having vehicle means for unitary movement of the same and wherein such vehicle means are individually driven.

Other objects and advantages of the invention will become apparent during the course of the following detailed description, taken in connection with the accompanying drawings, forming a portion of this specification, and in which drawings:

FIG. 1 is a somewhat diagrammatic top plan view of my improved irrigation system showing, in full lines, my improved unitary irrigation system; in dotted lines, misalignment that may occur and which must be corrected in movement of the system over rough or muddy terrain; and, in dot and dash lines, the position of the irrigation system to which it has been moved from the position as shown in full lines.

2

FIG. 3 is an enlarged top plan view of one end of my improved irrigation system.

FIG. 4 is an enlarged fragmentary side view of my improved irrigation system.

FIG. 5 is a sectional view taken substantially on the line 5—5 of FIG. 4, with the vehicle means thereof in the transport position.

FIG. 6 is a view similar to FIG. 5, with the vehicle means thereof in retracted position.

FIG. 7 is a sectional view taken substantially on the line 7—7 of FIG. 4.

FIG. 8 is an enlarged sectional view taken substantially on the line 8—8 of FIG. 7.

FIG. 9 is an enlarged sectional view taken substantially on the line 9—9 of FIG. 3.

FIG. 10 is an enlarged sectional view taken substantially on the line 10—10 of FIG. 9.

FIG. 11 is a view similar to FIG. 10 with the position maintaining pin of FIG. 10 removed therefrom and the internal shaft thereof rotated.

FIG. 12 is an enlarged sectional view taken substantially on the line 12—12 of FIG. 9.

FIG. 13 is an enlarged sectional view taken substantially on the line 13—13 of FIG. 7.

FIG. 14 is an enlarged sectional view taken substantially on the line 14—14 of FIG. 7.

FIG. 16 is a side plan view of another modified form of the invention.

Figure 15:
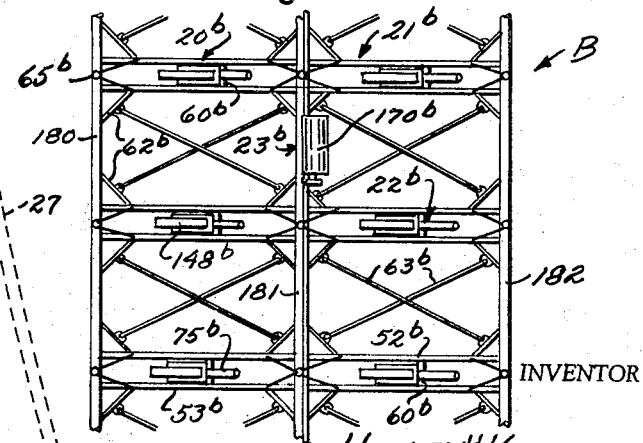
FIG. 15 is a fragmentary top plan view of a modified form of the invention.

In the drawings, wherein for the purpose of illustration are shown preferred embodiments of the invention, and wherein similar reference characters designate corresponding parts throughout the several views, the letter A may generally designate the irrigation system of FIGS. 1–14; B the irrigation system of FIG. 15; and C the irrigation system of FIG. 16.

Irrigation system A preferably comprises an irrigation unit including conduit means 19 and vehicle means 20, conduit means 19 being provided with a plurality of support means 21 having vehicle attaching means 22 whereby vehicle means 20 may be moved to a transport position in support of conduit means 19 for mobile orientation thereof and to a retracted position for support thereof independently of vehicle means 20; and vehicle positioning means 23 for movement of vehicle means 20 to the transport and detracted positions thereof.

Conduit means 19 preferably includes a pair of elongated parallel lateral pipe lines 26 and 27, lateral line 26 having terminal ends 28 and 29, and lateral line 27 having terminal ends 30 and 31. The respective facing sides of the terminal ends of lateral lines 26 and 27 are provided with a T-joint connection 34 and couplings 35, a transverse pipe line 36 being interconnected by couplings 35 between lateral lines 26 and 27 to the terminal T-joints 34 thereof adjacent terminal ends 28 and 30, and a transverse pipe line 37 being interconnected by couplings 35 between pipe lines 26 and 27 to T-joints 34 thereof adjacent terminal ends 29 and 31. Lateral lines 27 and 26 and transverse pipe lines 36 and 37 interconnected therewith provide a continuous flow-way of water about a substantially elongated polygonal path. A plurality of rotating sprinkler heads 40 and are provided along each lateral line 26 and 27 for emission of water therefrom in a predetermined pattern.

It should be particularly pointed out at this time that conduit means 19 provides a watering pattern through sprinkler heads 40 over a substantial area, lateral lines 26 and 27 usually being 1500 feet or more in length and transverse lines 36 and 37 usually being approximately 25 feet in length. Sprinkler heads 40 provide a watering pattern which overlaps centrally between lateral lines 26 and 27 and outwardly for a corresponding distance. Accordingly, conduit means 19 will provide a watering pattern 1500 feet or more in length and approximately 50 feet wide. Such watering pattern would terminate about centrally between the solid line showing of conduit means 19 in FIG. 1 and the dot and dash line showing thereof. Thus, when conduit means 19 is moved from the position as shown in full lines to the position as shown in dot and dash lines, the watering pattern from the dot-and-dash-line position would likewise extend centrally toward the full line showing, providing a complete water spray pattern between the two positions shown.

Although pipes 26, 27, 36 and 37 are shown in the drawings as being continuous one-piece lengths, it is to be understood that the same may comprise a plurality of relatively shorter lengths of pipe which are coupled together to provide a continuous water circuit. For instance, the same may comprise a coupling together of presently used pipes which are now hand moved from one position to another.

Three of the terminal ends of lateral lines 26 and 27 are provided with plugs and one terminal end thereof is interconnected to a water source. In the form shown in full lines in FIG. 1, terminal ends 29, 30 and 31 are respectively provided with plugs 42, 43 and 44, and terminal end 28 is interconnected to a swing line 47; and in the form shown in dot and dash lines in FIG. 1, plug 43 has been attached to terminal end 28 and swing line 47 attached to terminal end 30. Swing line 47 may be interconnected to a valve 48 leading from a riser 49 which is connected to a terminal underground water supply pipe 50.

Figure 1:
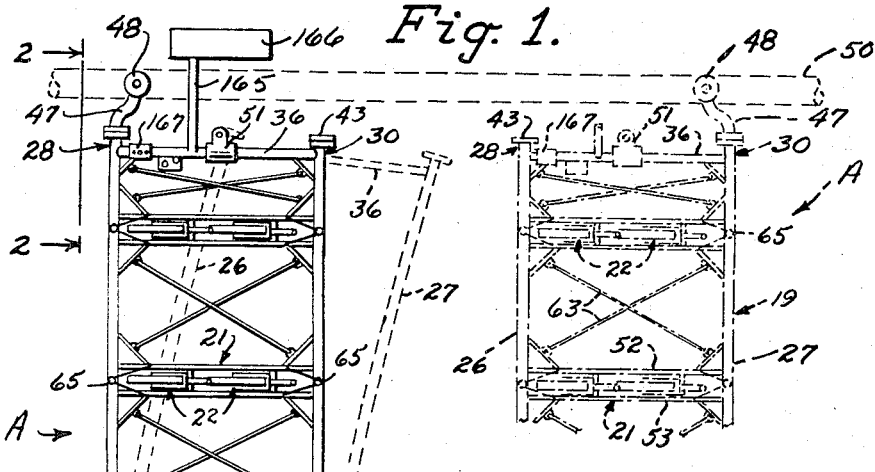
Figure 2:
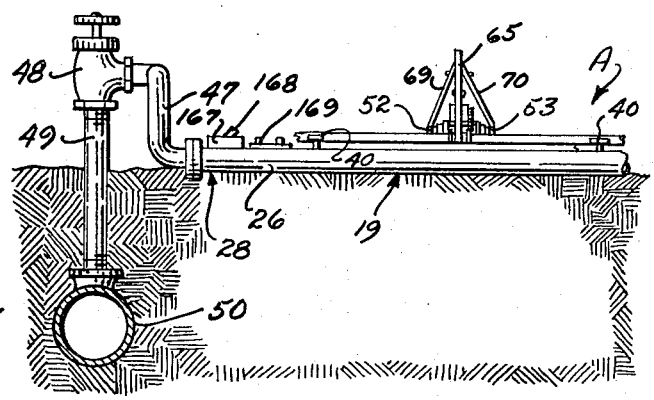
FIG. 2 is an enlarged sectional view taken substantially on the line 2—2 of FIG. 1.

Water supply pipe 50 is a conventional permanent irrigation installation in fields of this type, having a plurality of risers 49 provided with valves 48 and to which irrigation pipe may be interconnected. As shown in FIG. 1, the desired placement of irrigation system A may be such that a terminal end of lateral lines 26 or 27 does not exactly line up with a valve 48, in which case a somewhat flexible swing line 47 will be used for interconnection of conduit means 19 with a valve 48.

Pipes 26, 27, 36 and 37 may be provided with conventional drainage valves (not shown) for draining water therefrom when it is desired to move the system from one position to another.

A tractor hitch 51 may be interconnected to conduit means 19, the same being shown in the drawings as being attached to transverse line 36 for long distance moving of the irrigation system from field to field.

Support means 21 extend between lateral lines 26 and 27 and preferably include a pair of spaced apart truss-like members 52 and 53, one end of each being attached to lateral line 26 such as by clamps 54 and the other end thereof being attached to lateral line 27 such as by clamps 55.

Each truss-like member 52 and 53 preferably includes an upper elongated member 56, a lower elongated member 57, and a pair of upright support members 58 and 59 extending between members 56 and 57. An upper support shaft 60 and lower support shaft 61 may be interconnected between support upright 58 of truss-like member 52 and upright 58 of truss-like member 53, and between upright 59 of truss-like member 52 and upright member 59 of truss-like member 53. The purposes of the respective shafts 60 and 61 will be subsequently described.

Inasmuch as conduit means 19 is elongated, a plurality of brace members 62 having guy wires 63 interconnected therewith may be provided between support means 21 and conduit means 19, braces 62 and guy wires 63 comprising a means for maintaining longitudinal parallel alignment of lateral lines 26 and 27.

In order to maintain parallel vertical alignment of lateral lines 26 and 27, the same may be provided with a plurality of vertically extending rods 65 to which may be attached guy wires 66. Guy wires 66 may be interconnected at predetermined spaced intervals to the respective lateral line 26 or 27 by clamps 67.

A pair of brace members 69 and 71 may be interconnected at one end thereof to each vertical rod 65, diverging outwardly therefrom, the other end of brace member 69 being interconnected to truss-like member 52 and the other end of brace member 70 being interconnected to truss-like member 53. A horizontal shaft 72 having a pulley or sheave member 73 rotatably mounted thereon is interconnected between each brace member 69 and 70 adjacent lateral line 26, for a purpose which will be subsequently described.

Each support means 21 is preferably provided with a pair of vehicle attaching means 22, each of which support a vehicle means 20. Each vehicle attaching means 22 preferably comprises an elongated shaft 75 which is rotatably supported in a sleeve 76. The uppermost end of shaft 75 is provided with a rotatable coupling member 77 which may be attached to vehicle positioning means 23, as will be subsequently described. The lower end of shaft 75 is provided with a fork-like member having an upper shaft 78 and a pair of spaced apart side shafts 79 and 80. Vehicle means 20 is interconnected between side shafts 79 and 80, as will be subsequently described.

Sleeve 76 is provided with a bracket 85 for pivotal interconnection thereof to a shaft 60 extending between truss-like members 52 and 53. Each shaft 61 extending between truss-like members 52 and 53 is provided with a cup-like member 86 which, upon movement of vehicle attaching means 22 to a substantially vertical transport position will serve as a stop for maintaining the same in such vertical transport position.

In the forms of the invention herein shown, shafts 60 and 61 are shown as mounted in a fixed position on fixed uprights 58 and 59. In some cases it may be desirable to provide for variable spacing apart of vehicle means 20, and it is obvious that this could be accomplished with facility merely by mounting shafts 60 and 61 so that they are longitudinally movable along truss-like members 52 and 53 in order to secure the desired spacing.

Shaft 75 is provided with a ring-like member 90 which abuts against the lowermost end of sleeve 76 and acts as a stop in maintaining shaft 75 in a predetermined vertical position within sleeve 76. Shaft 75 is provided with a pair of spaced apart aligned openings 94 and sleeve 76 is provided with a pair of spaced apart aligned openings 95, the respective openings 94 and 95 being aligned so that, upon positioning of the same as shown in FIG. 10, a pin 97 may be passed therethrough preventing rotation of shaft 75 within sleeve 76. In this condition of non-rotatable alignment, vehicle means 20 will be positioned as shown in FIG. 1 so that conduit means 19 may be moved in a direction normal to the longitudinal axis thereof. Assuming that it was desired to pull the irrigation system angularly or in a direction otherwise than normal to the longitudinal axis thereof, such as by interconnection of a tractor to tractor hitch 51, it is obvious that shaft 75 would have to be rotated with respect to sleeve 76 in order to provide proper directional movement of vehicle means 20. In this case, pin 97 will be removed and shaft 75 may then be rotated within sleeve 76, such as is shown in FIG. 11.

Each vehicle means 20 preferably includes a frame 98 comprising a wheel support member 99 and a bracket member 100; wheel means 101; and drive means 102.

Wheel support member 99 preferably comprises a pair of substantially U-shaped members 103 and 104, U-shaped member 103 preferably including a pair of spaced apart legs 105 and 106 and U-shaped member 104 preferably including a pair of spaced-apart legs 108 and 109. Wheel support member 99 is preferably pivotally attached to vehicle attaching means 22 by pivot means 110 and 111 which respectively pivotally interconnect legs 79 and 80 of vehicle attaching means 22 to legs 105 and 106 of wheel support member 99.

Legs 105 and 106 are preferably hollow, each having positioned therewithin a stop washer 112, which is limited in movement therewithin such as by a crimp 113, and a coil spring 114. Legs 108 and 109 are of a dimension to respectively interfit within legs 105 and 106, being slidable therewithin, and abutting springs 114 in a manner to urge U-shaped member 104 away from U-shaped member 103, for a purpose as will be subsequently described.

Bracket member 100 preferably comprises a pair of spaced apart U-shaped members 120 and 121 which have their lowermost ends respectively interconnected to legs 105 and 106 of U-shaped member 103 and their uppermost ends interconnected by a cross bar 122.

Wheel means 101 preferably includes a pair of wheel members 123 and 124, wheel member 123 being mounted on rotatable axle 125 which is supported between legs 105 and 106 of U-shaped member 103 by axle housings 126. Wheel member 123 preferably includes an outer portion 132 having peripheral lugs 133 and an axle receiving portion 137. As shown in the drawings, a sprocket 139 forms a part of axle receiving portion 137 and axle receiving portion 137 and sprocket 139 are keyed, welded, or otherwise attached to axle 125 for rotation therewith. Of course, it is obvious that sprocket 139 could be provided separate from axle receiving portion 137 and might be interconnected to axle 125 by a set screw or other fastening medium.

Wheel member 124 is preferably mounted on rotatable axle 141 which is supported between legs 108 and 109 of U-shaped member 104 by axle housings 142. Wheel member 124 preferably includes an outer portion 144 having peripheral lugs 145 and an axle receiving portion 146. Axle receiving portion 146 may be keyed, welded or otherwise attached to axle 141 for rotation therewith.

As shown in FIG. 8, axles 125 and 141 are respectively supported upon U-shaped members 103 and 104 in juxtaposition so that the wheel members thereof are aligned for entraining of an endless member 148 thereabout. It will thus be observed that as springs 114 urge U-shaped member 104 away from U-shaped member 103 that this urging apart of the members will maintain endless member 148 under tension around and between wheel member 123 and 124.

Endless member 148 preferably comprises a looped belt 150 having a chain-like member 151 interconnected to the inner surface thereof and provided with a plurality of outwardly extending lugs 152 about the periphery thereof. Belt 150 is entrained about wheel members 123 and 124 with chain-like member 151 thereof engaging respective lugs 133 and 145 thereof, lugs 133 and 145 serving to rotatably support endless member 148 on wheel members 123 and 124. Lugs 152 provide for driving engagement of vehicle means 20 with the ground upon which it is supported.

Drive means 102 preferably comprises an air motor 155 having a drive shaft 156 to which is attached a drive sprocket 157. An endless chain 158 is entrained about and between sprockets 157 and 139 so that wheel means 101 may be operatively driven by drive means 102. Air motor 155 is preferably mounted on cross members 159 which are interconnected between members 120 and 121 of bracket member 100, as shown in FIG. 14. Cross members 159 are slidable along members 120 and 121 for tensioning of chain 158 between sprockets 139 and 157, being secured in position by fasteners 160.

Although I have found an air motor to provide an excellent drive for vehicle means 20, it is to be understood that any suitable form of gasoline, electrical, or other motive means may be utilized.

Each air motor 155 is provided with a pair of air supply lines 161 and 162 which lead through respective electromagnetic air valves 163 and 164 to a main air line 165. Air line 165 may be entrained along lateral line 26 to a compressor or other air supply source 166. Electro-magnetic air valves 163 may have their actuating wires entrained along lateral line 26 and lead to a switch bank 167 having a plurality of switches 168. Electric power to electro-magnetic air valves 163 and 164 may be provided by a battery 169. Although I have shown battery 169 as being of the rechargeable type, the same may comprise dry cell batteries or the electrical power might be derived from an auxiliary power source such as the battery of a pick-up truck or other equipment which is normally present in the field to be irrigated.

It is to be specifically noted that I have provided a separate drive means 102 for each wheel means 101 of the irrigation system. Inasmuch as the irrigation system will likely be maneuvered over rough and muddy ground, certain of the wheel means may have less traction than others in, for instance, movement of the irrigation system from the full lines position as shown in FIG. 1 to the dot-and-dash line showing. In this case, lateral lines 26 and 27 may be bent as shown in the dotted line showing of FIG. 1. When the lateral lines are thus bent it is imperative that they be realigned and individual drive of wheel means 101 permits the furthest advanced wheel means 101 to remain inactive while those which are slipping may be individually operated until lateral lines 26 and 27 are again linearly parallel. The operator of the irrigation system can therefore make facile adjustment in maintaining linear alignment of lateral lines 26 and 27.

Vehicle positioning means 23 preferably includes a drive means 170 having an elongated drive shaft 172. Drive means 170 is preferably mounted on lateral line 26 with elongated drive shaft 172 rotatably supported along lateral line 26 by mounts 173. It is to be noted that vehicle means 20 are mounted in tandem on each support means 21 and are operatively interconnected for concurrent raising and lowering of the vehicle attaching means 22 thereof by vehicle positioning means 23. This operative interconnection preferably comprises a winch drum or reel 175 keyed or otherwise attached to drive shaft 172 adjacent each support means 21; a cable 176 having one end thereof interconnected to reel 175 leading therefrom, over pulley 73 and being attached at the other end thereof to rotatable coupling member 77 of the vehicle attaching means 22 next adjacent thereto; and a cable 177 attached at one end thereof to the rotatable coupling member 77 of the vehicle attaching means 22 which is next adjacent lateral line 26 and attached at the other end thereof to the rotatable coupling member 77 of vehicle attaching means 22 which is next adjacent lateral line 27.

Although I preferably utilize an air motor as drive means 170, it is obvious that any form of gasoline or electrical motive power may be used. I have designated drive means 170 as an air motor inasmuch as I preferably use an air motor as the motive power for vehicle means 20 and the air motor of drive means 170 may therefore be interconnected to main air supply line 165 by an electro-magnetic air valve 178 in the same manner as are air lines 161 and 162 of air motor 155, and electro-magnetic air valve 178 may be operated by a switch 168 on switch bank 167.

Form B of the invention differs from form A in that it includes three elongated lateral lines 180, 181 and 182, rather than only the two lateral lines 26 and 27 of form A. Accordingly, identical reference characters with the exponent *b* have been applied to corresponding parts. This modification illustrates that more than two lateral lines may be used in the irrigation system and that vehicle means 20 and vehicle positioning means 23 may be appropriately located for support of the same.

Form C of the invention differs from form A only in the provision of legs or standards 185 which are spaced along conduit means 19 and support the same at a predetermined height above the ground. Accordingly, identical reference characters with the exponent c have been applied to corresponding parts. This modification illustrates that, where desirable, conduit means 19 may be supported above ground level.

In operation of my improved irrigation system, the same will be initially towed or otherwise moved into the field to be irrigated, such as by a tractor interconnected with hitch 51. In movement of the system and placement of the same in the field to be irrigated, wheel means 101 must be free to turn according to the direction of movement desired. This free turning is attained by removal of pin 97 from vehicle means 22, which permits rotation of shaft 75 within sleeve 76, as shown in FIG. 11.

After the irrigation system has been located at the desired position in the field to be irrigated, with one end thereof adjacent main water supply pipe 50, wheel means 101 will be adjusted for proper directional movement and pins 97 inserted within vehicle means 22 to maintain alignment of the same; the tractor will be unhitched from hitch 51; and an air supply source 166 will be interconnected to main air line 165. Swing line 47 will then be interconnected between valve 48 and the terminal end of conduit 26 or 27 which is next adjacent thereto, and end plugs such as 42, 43 and 44 will be placed over the other terminal ends of lateral lines 26 and 27. As shown in FIG. 1, there is preferably provided a switch bank 167 at each end of the system, so that the same can be operated from either end thereof. Thus, either end of the system may be positioned adjacent a water supply pipe 50.

After the irrigation system has been appropriately positioned and interconnected with a water source, switch 168 which activates drive means 170 is operated, unreeling cable 176 from reels 175, which permits lowering of conduit means 19 to the ground, as shown in FIG. 6. Water is then passed into conduit means 19, and through rotating sprinklers 40 to provide a predetermined spray pattern.

After the field has been sufficiently irrigated in the first position of the irrigation system, valve 48 is turned off, swing line 47 disconnected and the conventional drain plugs (not shown) of conduit means 19 are opened, permitting drainage of water from conduit means 19. Switch 168 which activates drive means 170 is then operated, drive means 170 rotating shaft 172 and reels 175 mounted thereon for winding up of cable 176 thereabout. The winding up of cable 176 directly raises the vehicle attaching means next adjacent lateral line 26 and, since the vehicle attaching means 22 which is adjacent lateral line 27 is interconnected to the first mentioned vehicle attaching means, by cable 177, upright movement of each tandem set of vehicle means supported by a given support means 21 will be simultaneously attained. Vertical raising of the vehicle attaching means will continue until shafts 75 thereof abut and interfit within cup-like members 86, at which time each vehicle attaching means will be in a vertical position and conduit means 19 lifted from the ground, as shown in FIG. 5.

The individual switches 168 which control flow of air through electro-magnetic air valves 163 and 164 are actuated, the flow of air therethrough activating the respective drive means 102 for each wheel means 101 and the irrigation system is moved to its next position, such as the position shown in dot-and-dash lines in FIG. 1. As previously described, in the event that lateral lines 26 and 27 become bent or distorted as shown in dotted lines in FIG. 1, drive means for certain of the wheel means may be deactivated while the others remain active, permitting the operator to realign the irrigation system.

When the irrigation system is located adjacent its new position, the drain valves (not shown) for conduit means 19 are closed, swing line 47 attached to another valve 48, and vehicle positioning means 23 activated in the same manner as previously described, and vehicle means 20 is moved from the transport position thereof to a retracted position, as previously described, permitting conduit means 19 to rest upon the ground.

The field is irrigated in increment by various positioning of my improved irrigation system in the same manner as previously described, and when this field has been completely irrigated, pins 97 may be again removed to permit 360 degrees turning of each wheel means, and the irrigation system moved until the desired position has been reached in the second field whereupon it will be located adjacent another water source and operated in the same manner as previously described in connection with field No. 1.

In irrigation fields it may be desirable to traverse the irrigation system in one direction in one field and in the opposite direction in another field, or to provide a reversal of direction in the same field. In these cases, air motor 155 might be reversed by controlling flow of air through either electromagnetic air valve 163 or 164, according to which gives the proper direction movement, or pins 197 might be removed and each wheel means 101 turned 180 degrees in the event that drive means 102 is uni-directional.

Various changes may be made to the forms of the invention herein shown and described without departing from the spirit of the invention or scope of the following claims.

I claim:

1. In an agricultural irrigation system, the combination of conduit means for conveying water along a predetermined path, a plurality of spaced sprinkler heads mounted on said conduit means for release of water from said conduit means in a predetermined spray pattern, a plurality of vehicle means, support means for mounting each said vehicle means on said conduit means, said support means including vehicle attaching means for movement of said vehicle means to a transport position in support of said conduit means thereon for mobile orientation of said conduit means and to a retracted position for support of said conduit means independently of said vehicle means, and vehicle positioning means for operable movement of said vehicle means to said transport position and said retracted position thereof.

2. The combination as specified in claim 1 wherein said conduit means includes a plurality of substantially parallel elongated lateral lines and a plurality of transverse lines interconnected between and intercommunicant with said lateral lines in defining a generally elongated polygonal path for circulation of water therethrough, and said support means for said vehicle means comprise a plurality of substantially parallel truss-like members juxtaposed transversely between said elongated lateral lines for maintaining said elongated lateral lines in a spaced apart substantially linerally parallel relationship with respect to one another.

3. The combination as specified in claim 2 wherein each said vehicle means include wheel means mounted on said truss-like members by said vehicle attaching means, said wheel means being rotatable for movement of said conduit means in a direction normal to the longitudinal axis of said elongated lateral lines, and independent drive means for said wheel means for selective driving of said wheel means in maintaining linear parallelism of said elongated lateral lines.

4. The combination as specified in claim 3 wherein said vehicle attaching means includes a support shaft for said wheel means, said shaft being rotatable through substantially 360 degrees for turning of said wheel means when said irrigation system is moved by an exterior power source, and said vehicle attaching means includes locking means for maintaining said shaft in a fixed position when uni-directional movement of said wheel means is desired.

5. The combination as specified in claim 3 wherein each said drive means comprises an air motor for individual and separate drive of a wheel means, air supply means, air lines interconnecting said air supply means with said air motors, and switch means interconnected with said air lines for selective operation of said air motors.

6. The combination as specified in claim 2 wherein the terminal ends of said elongated lateral lines are open for selective attachment thereto of a water supply, and removable cap means attached to the terminal ends of said elongated lines which are unattached to a water supply for closing the open ends thereof and providing a closed conduit circuit for water introduced through the end thereof attached to a water supply.

7. The combination as specified in claim 1 wherein each said vehicle means includes wheel means operable independently of the wheel means of the other vehicle means, means for pivotally mounting said vehicle attaching means on said support means in juxtaposition for pivotal movement of said vehicle means to transport and retracted positions, and said vehicle positioning means includes means interconnected with each said vehicle attaching means for complementary pivotal movement thereof.

8. The combination as specified in claim 1 wherein each said vehicle attaching means includes an elongated shaft, means for mounting said vehicle means on one end of said shaft in ground engaging position, a sleeve rotatably supporting said shaft, pivot means interconnecting said sleeve to said support means in juxtaposition for vertical upright and angular positioning of said shaft in respectively positioning said vehicle means in said transport and retracted positions thereof, and said support means includes means cooperating with said pivot means in maintaining vertical upright positioning of said shaft.

9. The combination as specified in claim 8 wherein said vehicle attaching means and said vehicle means thereof are mounted in tandem on each said support means, said vehicle positioning means includes drive means, drive shaft means, reel means, and cable means, said cable means being operably interconnected to said reel means for paying out and reeling in thereof and operably interconnected to the elongated shafts of said tandem mounted vehicle attaching means in vertical upright and angular pivotal positioning thereof as said cable is respectively reeled in and payed out.

10. The combination as specified in claim 1 wherein each said vehicle means includes a frame having a wheel support member and wheel means supported by said wheel support member, said wheel support member including a pair of substantially U-shaped members, means for slidably interconnecting said U-shaped members for movement toward and away from each other, and spring means urging said U-shaped members away from each other; and said wheel means including a pair of wheel members, axle means for rotatably mounting one of said wheel members on each said U-shaped member, and an endless belt-like member entrained about said wheel members.

11. The combination as specified in claim 10 wherein said vehicle means includes a bracket member and drive means, said bracket member comprising a mount for said drive means, and said drive means comprises an air motor operably interconnected with said wheel means for supplying motive power thereto.

12. In an agricultural irrigation system, the combination of conduit means for conveying water along a predetermined path; a plurality of spaced sprinkler heads mounted on said conduit means for release of water from said conduit means in a predetermined spray pattern; a plurality of vehicle means; support means for mounting each said vehicle means on said conduit means, each said vehicle means including a frame having a wheel support member, wheel means mounted on said wheel support member, and drive means for said wheel means, said drive means comprising an air motor for individual and separate drive of said wheel means; air supply means; air lines interconnecting said air supply means with each said air motor; and switch means interconnected with said air lines for selective activation and deactivation of each said air motor.

References Cited

UNITED STATES PATENTS

| | | | |
|---|---|---|---|
| Re. 26,285 | 10/1967 | Stafford | 239—212 |
| 1,966,783 | 7/1934 | Balaam | 239—212 |
| 2,726,895 | 12/1955 | Behlen | 239—212 X |
| 3,009,646 | 11/1961 | Purtell | 239—212 X |
| 3,157,193 | 11/1964 | Purtell | 137—344 |
| 3,175,635 | 3/1965 | Bryan | 239—212 X |
| 3,220,654 | 11/1965 | Purtell | 239—212 |
| 3,246,848 | 4/1966 | Bowers | 239—212 |
| 3,281,081 | 10/1966 | Purtell | 239—213 |

SAMUEL F. COLEMAN, *Primary Examiner.*